United States Patent
Mujumdar et al.

(10) Patent No.: US 12,252,127 B2
(45) Date of Patent: Mar. 18, 2025

(54) DYNAMICALLY CALCULATING LANE CHANGE TRAJECTORIES

(71) Applicant: Aptiv Technologies AG, Schaffhausen (CH)

(72) Inventors: Tapan R. Mujumdar, Rochester Hills, MI (US); Pardis Khayyer, Carmel, IN (US)

(73) Assignee: Aptiv Technologies AG, Schaffhausen (CH)

( * ) Notice: Subject to any disclaimer, the term of this patent is extended or adjusted under 35 U.S.C. 154(b) by 267 days.

(21) Appl. No.: 17/659,833

(22) Filed: Apr. 19, 2022

(65) Prior Publication Data

US 2023/0331231 A1 Oct. 19, 2023

(51) Int. Cl.
*B60W 30/18* (2012.01)
(52) U.S. Cl.
CPC ... *B60W 30/18163* (2013.01); *B60W 2520/06* (2013.01); *B60W 2540/215* (2020.02); *B60W 2552/10* (2020.02); *B60W 2552/30* (2020.02)
(58) Field of Classification Search
CPC ....... B60W 30/18163; B60W 2520/06; B60W 2552/30; B60W 10/20; B60W 2510/205; B60W 2050/0062; B60W 2050/0075
See application file for complete search history.

(56) References Cited

U.S. PATENT DOCUMENTS 5,521,579 A * 5/1996 Bernhard ........ B60W 30/18163
340/438
5,845,222 A * 12/1998 Yamamoto ............. B62D 6/003
701/41

(Continued)

FOREIGN PATENT DOCUMENTS

CN 105612091 A * 5/2016 ................ B60T 7/12
CN 104097637 B * 10/2018 ......... B62D 15/0255
(Continued)

OTHER PUBLICATIONS

"A dynamic lane-changing trajectory planning scheme for autonomous vehicles on structured road;" Jia et al. ; 2020 IEEE 9th International Power Electronics and Motion Control Conference (IPEMC2020-ECCE Asia) (pp. 2222-2227); Nov. 29, 2020. (Year: 2020).*

(Continued)

*Primary Examiner* — Khoi H Tran
*Assistant Examiner* — Jorge O Peche
(74) *Attorney, Agent, or Firm* — Harness, Dickey & Pierce, P.L.C.

(57) ABSTRACT

The techniques and systems herein are configured for dynamically calculating lane change trajectories. An offset that corresponds to an amount of asymmetry of a lane change trajectory (a zero-offset may be a symmetrical lane change trajectory) is determined for a lane change based on vehicle/driver preferences, road curvature, and/or road conditions. The offset is then used to calculate the lane change trajectory for the lane change, which is then provided to a vehicle system to execute the lane change according to the lane change trajectory. By dynamically calculating the lane change trajectory (e.g., actively determining the offset), lane change trajectories may be tailored to driver preferences, including asymmetry preferences and actions for different types of curves, as well as for road and weather conditions. Doing so, may not only improve driver experience due to better emulation of their behavior but also increase safety by decreasing unsafe lane change trajectories.

22 Claims, 5 Drawing Sheets

(56) References Cited

U.S. PATENT DOCUMENTS

| | | | | |
|---|---|---|---|---|
| 6,634,109 B1* | 10/2003 | Dale, Jr. | G01B 11/2755 | 33/203.18 |
| 6,813,562 B2* | 11/2004 | Altan | G08G 1/166 | 340/436 |
| 7,292,152 B2* | 11/2007 | Torkkola | G08B 21/06 | 340/426.2 |
| 7,519,471 B2* | 4/2009 | Shibata | G01C 21/365 | 340/425.5 |
| 7,579,942 B2* | 8/2009 | Kalik | B60Q 9/00 | 340/435 |
| 7,797,107 B2* | 9/2010 | Shiller | G08G 1/166 | 180/274 |
| 7,913,803 B2* | 3/2011 | Hidaka | B62D 5/008 | 180/443 |
| 8,086,406 B2* | 12/2011 | Ewerhart | B62D 6/001 | 342/147 |
| 8,170,739 B2* | 5/2012 | Lee | G01C 21/12 | 701/28 |
| 8,260,498 B2* | 9/2012 | Deng | B60W 10/20 | 701/72 |
| 8,374,743 B2* | 2/2013 | Salinger | G05D 1/0246 | 701/28 |
| 8,543,309 B2* | 9/2013 | Taneyhill | B60W 10/184 | 701/96 |
| 8,615,357 B2* | 12/2013 | Simon | G08G 1/165 | 701/96 |
| 8,781,170 B2* | 7/2014 | Mathieu | G01C 21/365 | 382/104 |
| 8,918,273 B2* | 12/2014 | Knoop | B60W 30/06 | 701/301 |
| 8,972,147 B2* | 3/2015 | Taneyhill | B60W 30/18145 | 701/96 |
| 8,977,464 B1* | 3/2015 | Takahashi | B60W 30/16 | 701/70 |
| 9,020,732 B2* | 4/2015 | Pilutti | B60W 30/09 | 180/170 |
| 9,108,664 B2* | 8/2015 | Lee | B62D 15/0255 | |
| 9,211,911 B2* | 12/2015 | Stählin | B62D 15/0265 | |
| 9,227,632 B1* | 1/2016 | Lee | B60W 30/0956 | |
| 9,229,453 B1* | 1/2016 | Lee | B60W 30/12 | |
| 9,266,429 B2* | 2/2016 | Tippelhofer | B60K 35/00 | |
| 9,731,762 B2* | 8/2017 | Hass | B62D 15/0265 | |
| 10,077,056 B1 | 9/2018 | Fields et al. | | |
| 10,145,953 B2* | 12/2018 | Talamonti | G06F 3/016 | |
| 10,220,837 B2* | 3/2019 | Takahara | B60W 30/045 | |
| 10,759,416 B1* | 9/2020 | Funke | B60T 8/17554 | |
| 11,136,021 B1* | 10/2021 | Funke | B62D 7/159 | |
| 2004/0090199 A1* | 5/2004 | Kanda | B62D 6/008 | 318/432 |
| 2004/0148080 A1* | 7/2004 | Ekmark | B62D 5/046 | 180/443 |
| 2006/0069481 A1* | 3/2006 | Kubota | B62D 5/0463 | 701/41 |
| 2007/0027597 A1* | 2/2007 | Breuel | B60W 30/16 | 701/41 |
| 2007/0219691 A1* | 9/2007 | Fukuba | B62D 6/008 | 701/42 |
| 2008/0119978 A1* | 5/2008 | Stieff | G01B 11/2755 | 701/31.4 |
| 2009/0319113 A1* | 12/2009 | Lee | B62D 15/025 | 701/1 |
| 2010/0036563 A1* | 2/2010 | Inou | B60W 10/20 | 701/1 |
| 2010/0082195 A1* | 4/2010 | Lee | B62D 15/0255 | 701/25 |
| 2010/0111338 A1* | 5/2010 | Ypma | H04R 25/552 | 381/314 |
| 2010/0174442 A1* | 7/2010 | Nishimori | B62D 5/0493 | 701/31.4 |
| 2010/0256835 A1 | 10/2010 | Mudalige | | |
| 2011/0029235 A1* | 2/2011 | Berry | G05D 1/0204 | 701/408 |
| 2011/0048600 A1* | 3/2011 | Yogou | B60C 11/00 | 152/209.5 |
| 2011/0153162 A1* | 6/2011 | Kezobo | B62D 5/0463 | 701/42 |
| 2011/0202250 A1* | 8/2011 | Miyajima | B60T 13/746 | 701/70 |
| 2012/0041632 A1* | 2/2012 | Garcia Bordes | B60W 50/14 | 701/29.1 |
| 2012/0109458 A1* | 5/2012 | Sidlosky | B60T 8/17551 | 701/41 |
| 2012/0176234 A1* | 7/2012 | Taneyhill | B60W 10/18 | 701/96 |
| 2012/0179350 A1* | 7/2012 | Taneyhill | B60W 10/06 | 701/96 |
| 2012/0316744 A1* | 12/2012 | Shimura | F02D 29/02 | 701/72 |
| 2013/0041541 A1* | 2/2013 | Kageyama | B60L 15/2036 | 701/99 |
| 2013/0057397 A1* | 3/2013 | Cutler | G08G 1/167 | 701/25 |
| 2013/0124043 A1* | 5/2013 | Degenstein | B62D 15/02 | 701/41 |
| 2014/0067250 A1* | 3/2014 | Bone | G08G 1/167 | 701/301 |
| 2014/0067252 A1* | 3/2014 | Knoop | G08G 1/167 | 701/400 |
| 2014/0222331 A1* | 8/2014 | Dorum | G01C 21/3819 | 701/446 |
| 2015/0094927 A1* | 4/2015 | Takahashi | B60W 30/143 | 701/93 |
| 2015/0120137 A1* | 4/2015 | Zeng | B60R 21/0134 | 701/41 |
| 2015/0165850 A1* | 6/2015 | Chiu | B60D 1/30 | 701/1 |
| 2015/0225014 A1* | 8/2015 | Takeda | G06V 20/588 | 701/41 |
| 2015/0232124 A1* | 8/2015 | Takeda | B62D 6/04 | 701/42 |
| 2015/0259006 A1* | 9/2015 | Inoue | B62D 15/025 | 701/41 |
| 2015/0353082 A1* | 12/2015 | Lee | B60W 10/20 | 701/41 |
| 2015/0353127 A1* | 12/2015 | Takeda | B62D 6/008 | 701/41 |
| 2015/0367852 A1* | 12/2015 | Nagatsuka | B60T 8/1766 | 701/70 |
| 2016/0018229 A1* | 1/2016 | Lee | B60W 60/001 | 701/409 |
| 2016/0052546 A1* | 2/2016 | Arakane | G05D 1/027 | 701/41 |
| 2016/0059852 A1* | 3/2016 | Yamakado | B60W 30/045 | 701/41 |
| 2016/0082971 A1* | 3/2016 | Fuehrer | B60W 30/18145 | 701/48 |
| 2016/0091896 A1* | 3/2016 | Maruyama | B60W 30/18163 | 701/23 |
| 2016/0185388 A1* | 6/2016 | Sim | G06V 20/58 | 701/41 |
| 2016/0304126 A1* | 10/2016 | Yamaoka | B62D 15/0255 | |
| 2017/0001650 A1* | 1/2017 | Park | B60W 50/10 | |
| 2017/0018189 A1* | 1/2017 | Ishikawa | G05D 1/0088 | |
| 2017/0259819 A1* | 9/2017 | Takeda | B60W 30/18163 | |
| 2017/0297611 A1* | 10/2017 | Raad | B62D 5/0463 | |
| 2017/0305416 A1* | 10/2017 | Yamakado | B60T 7/12 | |
| 2017/0320521 A1* | 11/2017 | Fujita | G01C 21/3602 | |
| 2017/0349173 A1* | 12/2017 | Nishiguchi | B60W 60/00 | |
| 2017/0350975 A1* | 12/2017 | Asanuma | G01S 13/931 | |
| 2018/0001888 A1* | 1/2018 | Takahara | B60W 30/02 | |
| 2018/0158262 A1* | 6/2018 | Hizaki | G07C 5/0825 | |
| 2018/0178716 A1* | 6/2018 | Fujii | G08G 1/167 | |
| 2018/0181132 A1* | 6/2018 | Kunihiro | G05D 1/0088 | |
| 2018/0281804 A1* | 10/2018 | Talamonti | B62D 15/029 | |
| 2018/0284266 A1* | 10/2018 | Talamonti | B60W 30/18163 | |
| 2018/0286242 A1* | 10/2018 | Talamonti | B60K 35/60 | |
| 2018/0297640 A1* | 10/2018 | Fujii | G05D 1/0257 | |
| 2019/0196487 A1* | 6/2019 | Akiyama | B60W 30/18163 | |
| 2019/0212749 A1 | 7/2019 | Chen et al. | | |

(56) References Cited

U.S. PATENT DOCUMENTS

| | | | |
|---|---|---|---|
| 2019/0378415 A1* | 12/2019 | Shinohara | G08G 1/166 |
| 2020/0207353 A1 | 7/2020 | Chen et al. | |
| 2020/0247414 A1* | 8/2020 | Ishioka | B60W 50/14 |
| 2020/0247416 A1* | 8/2020 | Tsuji | B60W 30/18163 |
| 2020/0290621 A1* | 9/2020 | Ji | B60W 50/14 |
| 2020/0339134 A1* | 10/2020 | Pennala | B60W 50/0205 |
| 2020/0377082 A1* | 12/2020 | Nassouri | B60W 30/0956 |
| 2021/0046864 A1* | 2/2021 | Elgrably | B60Q 1/324 |
| 2021/0055426 A1* | 2/2021 | Bansal | G05D 1/0231 |
| 2021/0063162 A1* | 3/2021 | Moskowitz | G01C 21/28 |
| 2021/0213959 A1 | 7/2021 | Shahriari et al. | |
| 2021/0269040 A1* | 9/2021 | Kurokawa | B62D 15/0265 |
| 2021/0271254 A1* | 9/2021 | Chen | G06N 3/08 |
| 2021/0380117 A1 | 12/2021 | Gonzalez | |
| 2022/0017094 A1 | 1/2022 | Chen | |
| 2022/0073076 A1 | 3/2022 | Du | |
| 2022/0073098 A1 | 3/2022 | D'Orazio et al. | |
| 2022/0089221 A1* | 3/2022 | Makkus | B62D 15/0245 |
| 2022/0119004 A1 | 4/2022 | Avadhanam et al. | |
| 2022/0215603 A1* | 7/2022 | Goldman | B60W 30/18163 |
| 2022/0266823 A1* | 8/2022 | Arima | B62D 7/159 |
| 2023/0104188 A1* | 4/2023 | Zilberman | G01P 21/00 701/33.1 |
| 2023/0139711 A1* | 5/2023 | Ke?ler | B62D 15/025 701/41 |
| 2023/0211786 A1* | 7/2023 | Peyret | B60W 40/10 701/36 |
| 2023/0331231 A1* | 10/2023 | Mujumdar | B60W 60/001 |
| 2023/0331232 A1* | 10/2023 | Tominaga | B60W 30/18163 |
| 2023/0406300 A1* | 12/2023 | Lee | B60W 30/12 |
| 2024/0092364 A1* | 3/2024 | Benaziz | G05D 1/0212 |
| 2024/0182035 A1* | 6/2024 | Lin | B60W 30/0953 |

FOREIGN PATENT DOCUMENTS

| | | | | |
|---|---|---|---|---|
| CN | 108688665 A | * | 10/2018 | B60K 35/00 |
| CN | 117690288 A | * | 3/2024 | G08G 1/0116 |
| CN | 117818642 A | * | 4/2024 | |
| DE | 19727225 A1 | * | 1/1998 | G08G 1/02 |
| DE | 10354018 B4 | * | 8/2009 | B60T 8/17557 |
| DE | 102016215528 A1 | | 2/2018 | |
| DE | 102018107340 A1 | * | 10/2018 | B60K 35/00 |
| DE | 102018107341 A1 | * | 10/2018 | B60K 35/00 |
| DE | 102018107502 A1 | * | 10/2018 | B60K 35/00 |
| DE | 102017221408 A1 | * | 2/2019 | B60W 30/10 |
| DE | 102018212753 A1 | * | 3/2019 | B60W 20/00 |
| DE | 102022206105 A1 | * | 12/2023 | B60G 17/0185 |
| EP | 3744602 A1 | | 12/2020 | |
| EP | 3825979 A1 | * | 5/2021 | B60W 30/09 |
| JP | H05297943 A | * | 11/1993 | |
| JP | H09301206 A | * | 11/1997 | |
| JP | H09301207 A | * | 11/1997 | |
| JP | 2018090248 A | * | 6/2018 | |
| KR | 20170069715 A | * | 6/2017 | |
| WO | WO-2016110732 A1 | * | 7/2016 | |
| WO | WO-2018055916 A1 | * | 3/2018 | B60W 10/04 |
| WO | 2020166113 A1 | | 8/2020 | |

OTHER PUBLICATIONS

"Embedded Driver-Assistance System Using Multiple Sensors for Safe Overtaking Maneuver;" Chiang et al.; IEEE Systems Journal (vol. 8, Issue: 3, pp. 681-698); Sep. 12, 2014. (Year: 2014).*
"Automated Lane Change Featuring Re-Planning in Dynamic Environments and Sensitivity Analysis of Main Operational Parameters;" Lex et al.; IEEE Access (vol. 10, pp. 8604-8616); Jan. 1, 2022. (Year: 2022).*
"Foreign Office Action", EP Application No. 21212702.1, Feb. 14, 2023, 6 pages.
"Extended European Search Report", EP Application No. 21212702.1, May 11, 2022, 11 pages.
"Lane-centering problems may limit drivers' acceptance of automated systems", Retrieved at: https://www.iihs.org/news/detail/lane-centering-problems-may-limit-drivers-acceptance-of-automated-systems, Oct. 3, 2019, 4 pages.
Gorzelany, et al., "Safety Last? Driver-Assist Features That Are Most Often Switched Off", Jul. 7, 2000, 5 pages.
Heil, et al., "Adaptive and Efficient Lane Change Path Planning for Automated Vehicles", Nov. 2016, pp. 479-484.
Phelan, "Surprising tech features land these vehicles atop Wards' 10-best UX list", Retrieved at: https://www.freep.com/story/money/cars/mark-phelan/2020/08/07/peppy-wake-up-tunes-remote-park-these-cars-surprise-you/3323143001/, Aug. 7, 2020, 7 pages.
"Extended European Search Report", EP Application No. 23159570.3, Aug. 22, 2023, 8 pages.
Sporrer, et al., "Realsimulation von Spurwechselvorgängen im Strassenverkehr", Verkehrsunfall Und Fahrzeugtechnik, vol. 31, Jan. 1, 1998, 8 pages.

* cited by examiner

DYNAMICALLY CALCULATING LANE CHANGE TRAJECTORIES

BACKGROUND

Autonomous driving technologies are increasingly being implemented in vehicles. Such technologies enable vehicles to adjust speeds, apply brakes, and even steer the vehicles in which they are implemented. While operating in autonomous modes, many vehicles are able to execute lane changes, triggered either automatically or via a user input (e.g., a turn signal switch). Trajectories for the lane changes are calculated and the vehicles follow the calculated trajectories. The calculated trajectories, however, are often statically determined (e.g., they are the same for every driver and road condition). Static trajectories may lead to lane changes that are either not what drivers expect or unsafe for certain conditions.

SUMMARY

This document is directed to systems, apparatuses, techniques, and methods of dynamically calculating lane change trajectories. The systems and apparatuses may include components or means (e.g., processing systems) for performing the techniques and methods described herein.

Some aspects described below include a system including at least one processor configured to receive a request for a lane change trajectory for a lane change of a host vehicle that is traveling along a roadway. The processor is also configured to determine whether a preferred offset corresponding to an asymmetry of the lane change trajectory exists for the host vehicle. Responsive to determining that the preferred offset exists, the processor is further configured to calculate the lane change trajectory based on the preferred offset. Responsive to determining that the preferred offset does not exist, the processor is further configured to calculate the lane change trajectory as a symmetrical lane change trajectory. The processor is further configured to provide the lane change trajectory to a vehicle component effective to cause the vehicle component to execute the lane change according to the lane change trajectory.

The techniques and methods may be performed by the above system, another system or component, or a combination thereof. Some aspects described below include a method that includes receiving a request for a lane change trajectory for a lane change of a host vehicle that is traveling along a roadway. The method also includes determining whether a preferred offset corresponding to an asymmetry of the lane change trajectory exists for the host vehicle. Responsive to determining that the preferred offset exists, the method further includes calculating the lane change trajectory based on the preferred offset. The method also includes providing the lane change trajectory to a vehicle component effective to cause the vehicle component to execute the lane change according to the lane change trajectory.

The components may include computer-readable media (e.g., non-transitory storage media) including instructions that, when executed by the above system, another system or component, or a combination thereof, implement the method above and other methods. Some aspects described below include computer-readable storage media including instructions that, when executed, cause at least one processor to receive a request for a lane change trajectory for a lane change of a host vehicle that is traveling along a roadway. The instructions further cause the processor to determine whether a preferred offset corresponding to an asymmetry of the lane change trajectory exists for the host vehicle. Responsive to determining that the preferred offset exists, the instructions further cause the processor to calculate the lane change trajectory based on the preferred offset. Responsive to determining that the preferred offset does not exist, the instructions further cause the processor to calculate the lane change trajectory as a symmetrical lane change trajectory. The instructions also cause the processor to provide the lane change trajectory to a vehicle component effective to cause the vehicle component to execute the lane change according to the lane change trajectory.

This Summary introduces simplified concepts of dynamically calculating lane change trajectories that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques of dynamically calculating lane change trajectories are described with reference to the following drawings that use some of the same numbers throughout to reference like or examples of like features and components.

DETAILED DESCRIPTION

Overview

Autonomous driving technologies enable vehicles to execute lane changes, triggered either automatically or via a user input (e.g., a turn signal switch). Trajectories for the lane changes are calculated and the vehicles follow the calculated trajectories.

Traditional means of generating the trajectories rely on static calculations. For example, the trajectories are often symmetric (e.g., the entries and exists have equal aggressiveness). Although some techniques have been developed to generate asymmetric trajectories, they are often fixed in their asymmetry (e.g., they are static trajectories). In many cases, a driver may wish to adjust the asymmetry due to preference or for various scenarios. Furthermore, the asymmetric trajectories may not be suitable for certain road and weather conditions.

The techniques and systems herein are configured for dynamically calculating lane change trajectories. An offset that corresponds to an amount of asymmetry of a lane change trajectory (a zero-offset may be a symmetrical lane change trajectory) is determined for a lane change based on vehicle/driver preferences, road curvature, and/or road conditions. The offset is then used to calculate the lane change trajectory for the lane change, which is then provided to a vehicle system to execute the lane change according to the lane change trajectory.

By dynamically calculating the lane change trajectory (e.g., actively determining the offset), lane change trajectories may be tailored to driver preferences, including asymmetry preferences and actions for different types of curves, as well as for road and weather conditions. Doing so, may not only improve driver experience due to better emulation of their behavior but also increase safety by decreasing unsafe lane change trajectories.

Example Environment

Figure 1:
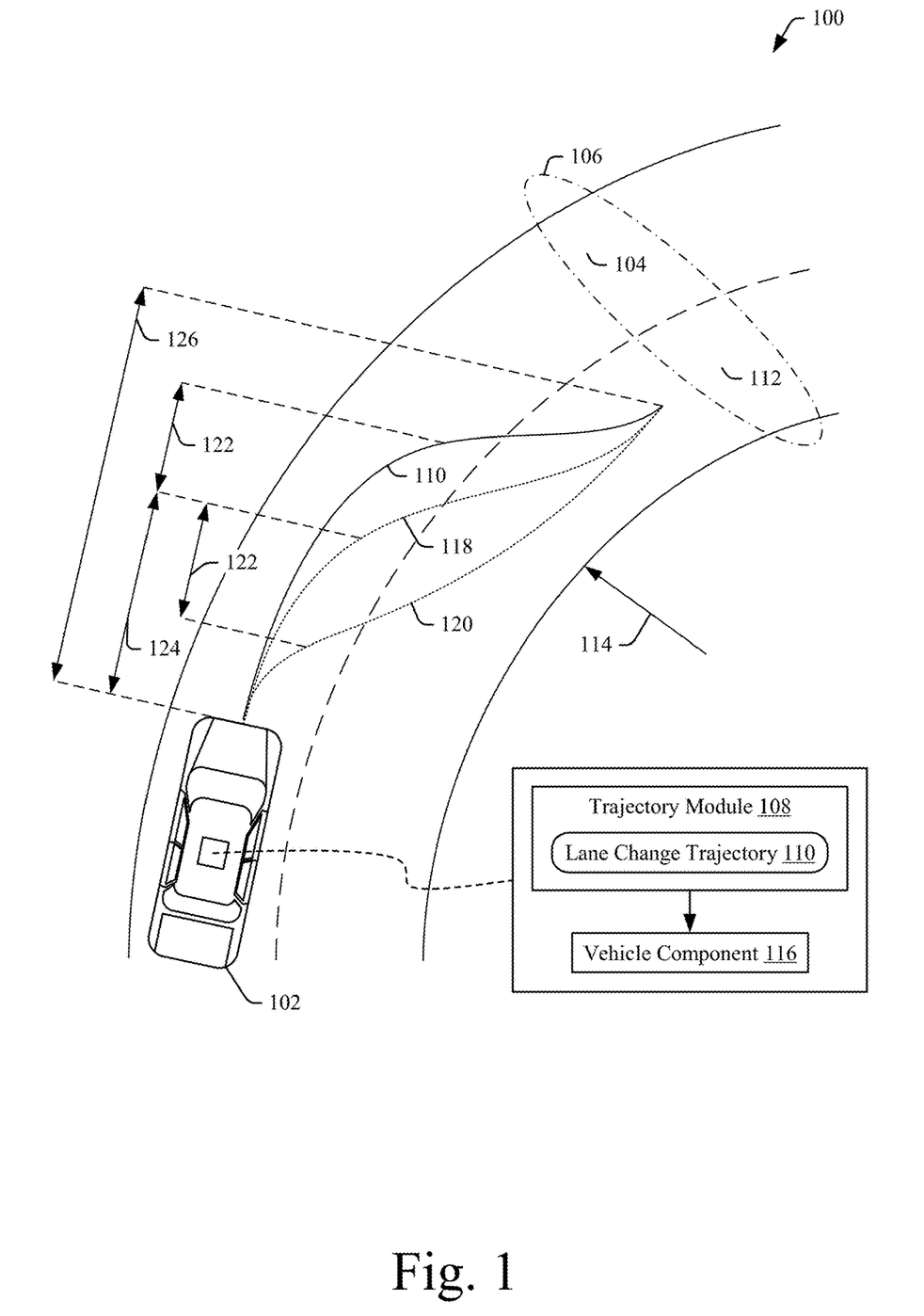
FIG. 1 illustrates, in accordance with techniques of this disclosure, an example environment where dynamically calculating lane change trajectories may be used.

FIG. 1 illustrates an example environment 100 where dynamically calculating lane change trajectories may be used. The example environment 100 contains a host vehicle 102 that is traveling in a lane 104 of a roadway 106. The host vehicle 102 may be any type of system (automobile, car, truck, motorcycle, e-bike, boat, air vehicle, and so on).

A trajectory module 108 of the host vehicle 102 receives a request to generate a lane change trajectory 110 for a lane change from the lane 104 to an adjacent lane 112. The roadway 106 has a curvature 114 (magnitude and left/right relative to a heading of the host vehicle 102) and, in the example environment 100, the lane change is from an outer lane to an inner lane (relative to the curve).

A driver of the host vehicle 102 or a vehicle component 116 (e.g., advanced driver assist system (ADAS), autonomous driving system, autopilot system) may initiate the lane change, which causes the request to be received by the trajectory module 108. Based on a calculated offset, the trajectory module 108 calculates the lane change trajectory 110 and outputs it for receipt by the vehicle component 116 that uses the lane change trajectory 110 to execute the lane change.

In the example environment 100, the lane change trajectory 110 has an asymmetry. That is, the entry and exits of the lane change do not have equal steering intensities (e.g., aggressiveness of steering inputs). The lane change trajectory 110 has a relaxed entry and an aggressive exit. This may be due to vehicle/driver preferences, a speed of the host vehicle 102, and/or the curvature 114 (e.g., whether the roadway is curving left or right relative to the heading of the host vehicle 102). For example, a driver of the host vehicle 102 may wish to have the lane change trajectory 110 as shown (e.g., a relaxed entry and aggressive exit) because the lane change is from an outer to an inner lane (relative to the curve).

In other environments (e.g., other preferences, other speeds, other curvatures), generated lane change trajectories may be symmetrical or have an asymmetry different than that of lane change trajectory 110. For example, a symmetrical lane change trajectory 118 is shown as an alternative to the lane change trajectory 110. The symmetrical lane change trajectory 118 has equal entry and exit steering intensities. As another example, another lane change trajectory 120 with a different asymmetry than the lane change trajectory 110 is shown. The other lane change trajectory 120 has an aggressive entry and a relaxed exit.

An offset 122 is used to define symmetry/asymmetry of the lane change trajectory 110. The offset 122 corresponds to a distance and direction from an inflection point of the symmetrical lane change trajectory 118 for the environment to an inflection point of the lane change trajectory 110. The inflection point of the symmetrical lane change trajectory 118 is at a distance 124 that is half of a total distance 126 between the start and end points.

In the example environment 100, the offset 122 is positive, indicating the relaxed entry and aggressive exit. The offset 122 is negative for the other lane change trajectory 120, indicating the aggressive entry and relaxed exit. The symmetrical lane change trajectory 118 may not have an offset or have a zero offset. It should be noted that the start and end points of the lane change are environment-dependent, thus, each environment/situation may have a lane change trajectory 110 that is different.

The conventions of the offset 122 may vary without departing from the scope of this disclosure. For example, the offset 122 may be a percentage of the distance 126 (e.g., the symmetrical lane change trajectory 116 has an offset of 50% and the offset 122 is 75%). Furthermore, although the offset 122 is shown in the longitudinal direction, the offset 122 may be relative to any direction (e.g., lateral, along a direction between the start and end points of the lane change, or some other reference). Further, the offset 122 may be relative to another point (e.g., the start point of the lane change, the end point of the lane change). Regardless of how it is referenced, the offset 122 corresponds to an asymmetry (or lack thereof) of the lane change trajectory 110 and is dynamic (e.g., it changes based on the environment).

By dynamically selecting the offset 122 and computing the lane change trajectory 110 based on it, the trajectory module 108 can adapt the lane change trajectory 110 for driver preferences as well as for road conditions. Doing so, not only increases user experience but may also increase safety through mitigation of unsafe lane change trajectories.

Example System

Figure 2:
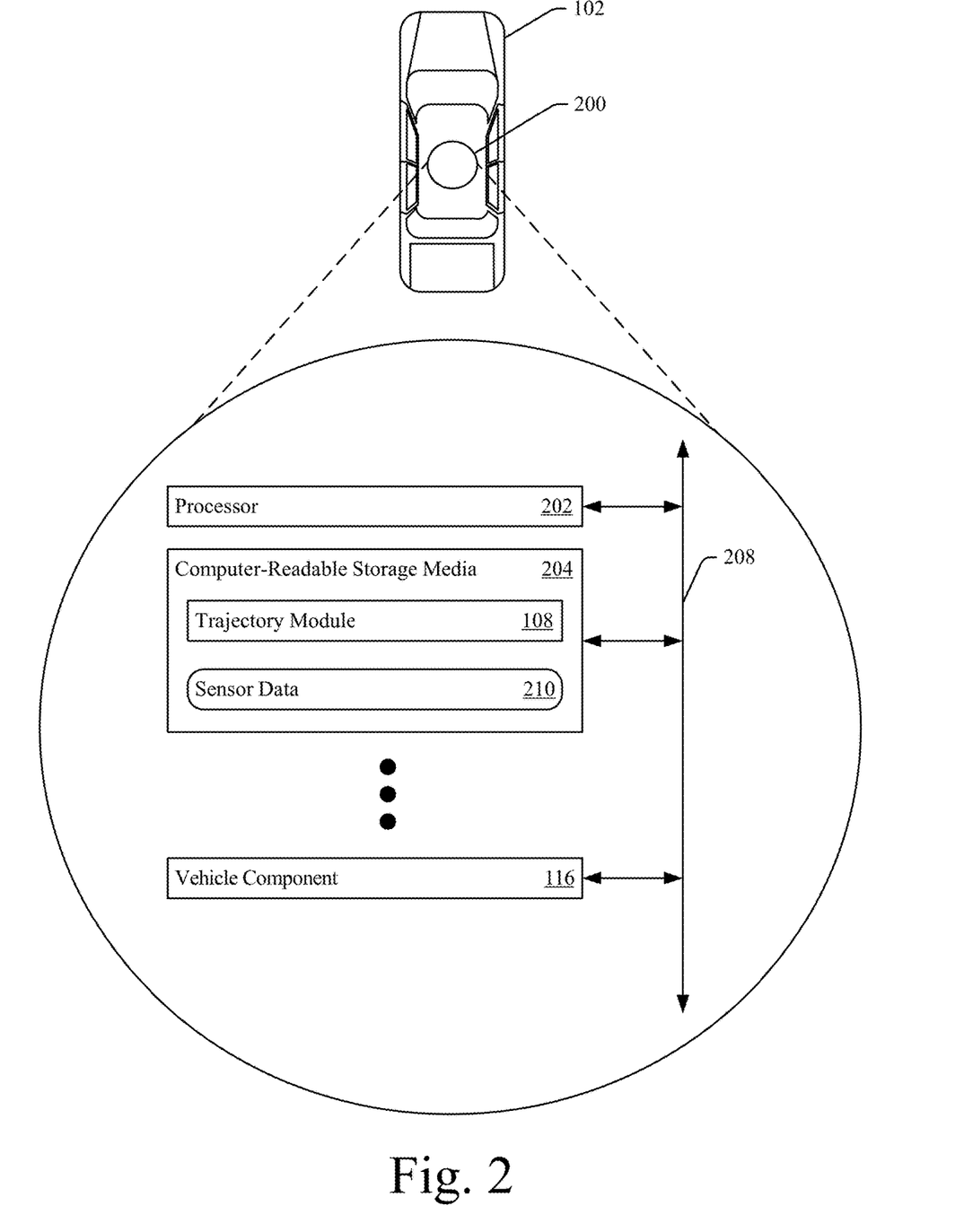
FIG. 2 illustrates, in accordance with techniques of this disclosure, an example system of a host vehicle configured for dynamically calculating lane change trajectories.

FIG. 2 illustrates an example system 200 configured to be disposed in the host vehicle 102 and configured to dynamically calculate lane change trajectories. Components of the example system 200 may be arranged anywhere within or on the host vehicle 102. The example system 200 may include at least one processor 202, computer-readable storage media 204 (e.g., media, medium, mediums), and the vehicle component 116. The components are operatively and/or communicatively coupled via a link 208.

The processor 202 (e.g., application processor, microprocessor, digital-signal processor (DSP), controller) is coupled to the computer-readable storage media 204 via the link 208 and executes computer-executable instructions (e.g., code) stored within the computer-readable storage media 204 (e.g., non-transitory storage device such as a hard drive, solid-state drive (SSD), flash memory, read-only memory (ROM)) to implement or otherwise cause the trajectory module 108 (or a portion thereof) to perform the techniques described herein. Although shown as being within the computer-readable storage media 204, the trajectory module 108 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 202 and the computer-readable storage media 204 may be any number of components, comprise multiple components distributed throughout the host vehicle 102, located remote to the host vehicle 102, dedicated or shared with other components, modules, or systems of the host vehicle 102, and/or configured differently than illustrated without departing from the scope of this disclosure.

The computer-readable storage media 204 also contains sensor data 210 generated by one or more sensors or types of sensors (not shown) that may be local or remote to the example system 200. The sensor data 210 indicates or otherwise enables the determination of information usable to perform the techniques described herein. For example, the sensors may generate sensor data 210 indicative of aspects of an environment around the host vehicle 102 (e.g., the example environment 100). In some implementations, the sensor data 210 may come from a remote source (e.g., via link 208). The example system 200 may contain a communication system (not shown) that receives sensor data 210 from the remote source.

The vehicle component 116 contains one or more systems or components that are communicatively coupled to the trajectory module 108 and configured to use the lane change trajectory 110 to execute a lane change. For example, the vehicle component 116 may comprise an ADAS or autonomous driving system with means for accelerating, steering, or braking the host vehicle 102. The vehicle component 116 is communicatively coupled to the trajectory module 108 via the link 208. Although shown as separate components, the trajectory module 108 may be part of the vehicle component 116 and visa-versa.

Example Flows

Figure 3:
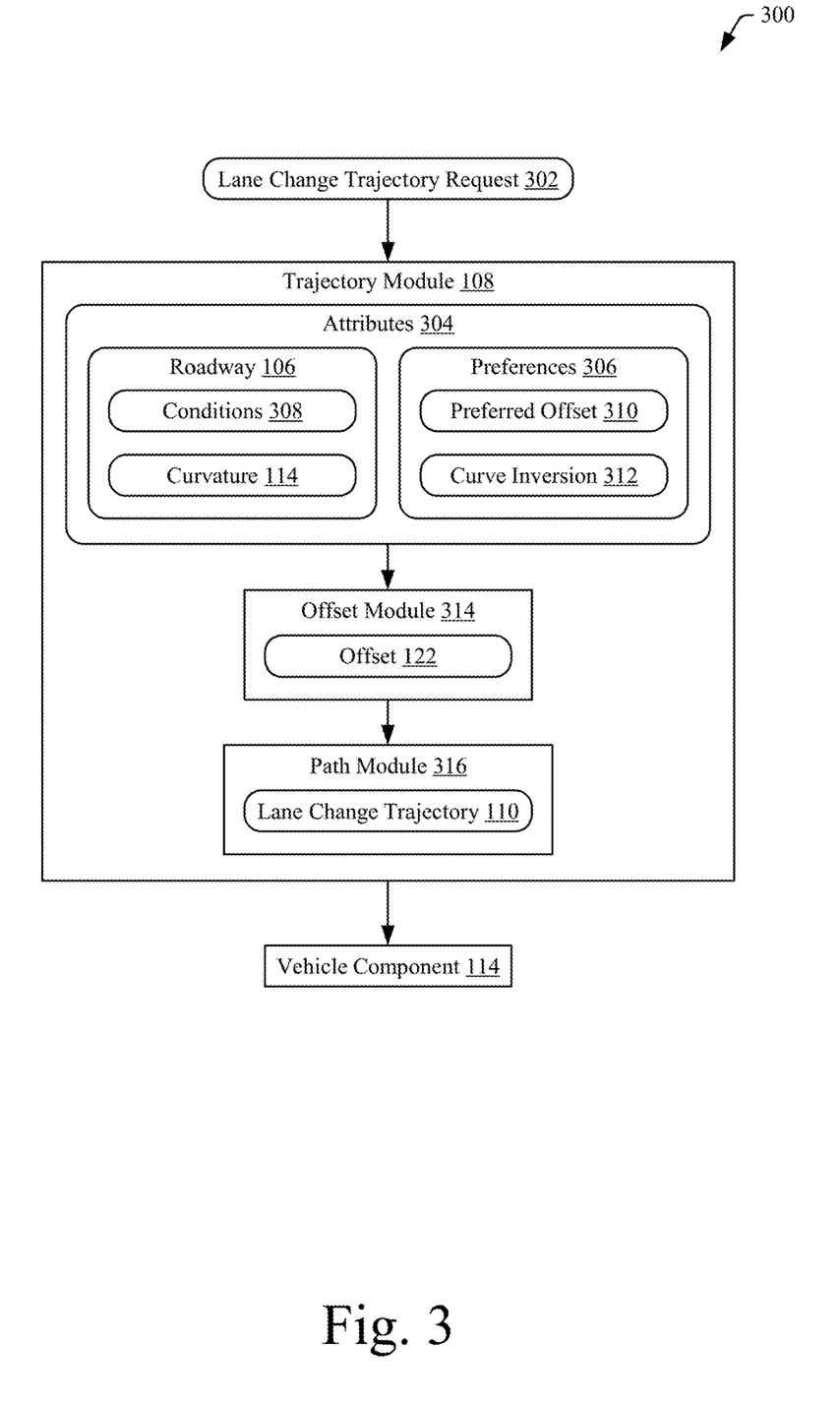
FIG. 3 illustrates, in accordance with techniques of this disclosure, an example flow of dynamically calculating lane change trajectories.

FIG. 3 is an example flow 300 of dynamically calculating lane change trajectories. The example flow 300 may be implemented in any of the previously described environments and by any of the previously described systems or components. For example, the example flow 300 can be implemented in the example environment 100 and/or by the example system 200. The example flow 300 may also be implemented in other environments, by other systems or components, and utilizing other flows or techniques. The example flow 300 may be implemented by one or more entities (e.g., the trajectory module 108). The order in which the operations are shown and/or described is not intended to be construed as a limitation, and the order may be rearranged without departing from the scope of this disclosure. Furthermore, any number of the operations can be combined with any other number of the operations to implement the example flow or an alternate flow.

The example flow 300 starts with the trajectory module 108 receiving a lane change trajectory request 302 for a lane change. The lane change trajectory request 302 may be received from the vehicle component 116, based on a driver input, or generated internally by the trajectory module 108. The lane change trajectory request 302 may identify the adjacent lane 112 (e.g., change to a left or right lane, change to a slower or faster lane, change to a numbered lane).

The trajectory module 108 also obtains attributes 304 that may affect the lane change trajectory 110. The attributes 304 may be of an environment (e.g., the example environment 100) and/or vehicle/driver settings. As shown, the attributes 304 include aspects about the roadway 106 and preferences 306.

The aspects of the roadway 106 include conditions 308 and the curvature 114. The conditions 308 include dynamic aspects that may affect a safety or viability of certain lane change trajectories (e.g., weather, road surface conditions, road surface, gradient(s), quality of lane markings). The curvature 114 may indicate a radius of the roadway 106 at a location of the lane change and/or whether the roadway 106 curves to the left or right of a heading of the host vehicle 102.

The preferences 306 include aspects of vehicle and/or driver preferences for lane changes, including a preferred offset 310 and a curve inversion 312. The preferred offset 310 is indicative of a preference for a certain shape of the lane change trajectory 110. For example, the preferred offset 310 may correspond to an aggressive entry and relaxed exit (e.g., the other lane change trajectory 120 in the example environment 100), a symmetrical lane change (e.g., the symmetrical lane change trajectory 118 in the example environment 100), a relaxed entry and aggressive exit (e.g., the lane change trajectory 110 in the example environment 100), or anything in-between. The preferred offset 310 may be a relative value (e.g., 0-100 with 0 being the most aggressive entry and most relaxed exit, 50 being the symmetrical lane change, and 100 being the most relaxed entry and most aggressive exit), an actual offset amount (distance), or some other value that influences a shape of the lane change trajectory 110.

The curve inversion 312 is indicative of a preference to invert the preferred offset 310 for an inside curve lane change (e.g., from an outer lane to an inner lane relative to the curvature 114). In other words, the entry and exit are reversed from the preferred offset 310 in such environments. In some implementations, there may be a threshold for applying the curve inversion 312. For example, the curve inversion 312 may only be applied if a radius of the roadway 106 is below a certain value (e.g., the curve needs to be sharp enough to implement the curve inversion 312). The threshold may also be dynamic (e.g., based on a speed of the host vehicle 102).

Using the example environment 100 as an example, the lane change is from an outer lane to an inner lane. Assuming that the curve inversion 312 is set to "yes" and that the preferred offset 310 indicates a preference for an aggressive entry and relaxed exit (e.g., the other lane change trajectory 120), the trajectory module 108 generates the lane change trajectory 110 that has a relaxed entry and an aggressive exit (opposite the preferred offset 310).

The preferences 306 may be vehicle specific, driver specific, or some combination thereof. For example, there may be a single set of preferences 306 for the host vehicle 102 or there may be different preferences 306 for different drivers. The trajectory module 108 may determine a driver of the host vehicle 102 and obtain the preferences 306 for that driver. The preferences 306 may be input via at least one user input (e.g., button, knob, graphical user interface (GUI), touchscreen, navigation device, voice-control). For example, to select the preferred offset 310, a driver of the host vehicle 102 may move a slider, select a value, or input a value. Limits of the preferred offset 310 may be predetermined to ensure safe operation and may be vehicle-specific (e.g., very aggressive steering inputs may be unsafe, and thus, not selectable by the driver).

The attributes 304 may be acquired, received, or determined by the trajectory module 108. For example, the trajectory module 108 may determine the attributes 304 directly from the sensor data 210, from a bus or interface connected to sensors that interface with the example system 200, or from another module or system of the example system 200. Regardless of how or where the attributes 304 are gathered, received, derived, or calculated, the trajectory module 108 is configured to use the attributes 304 to determine the offset 122 and calculate the lane change trajectory 110.

Figure 4:
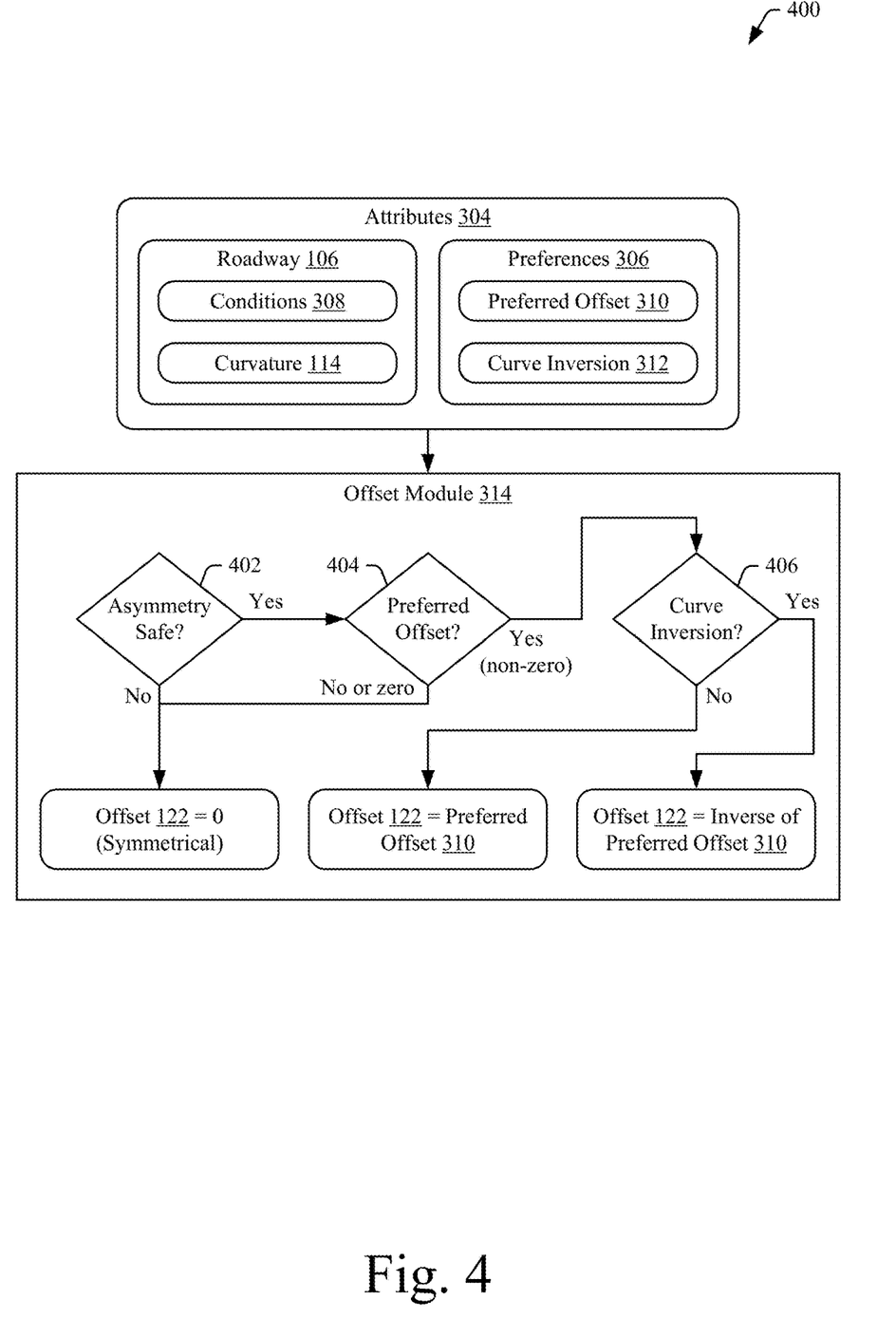
FIG. 4 illustrates, in accordance with techniques of this disclosure, an example flow of generating offsets for dynamically calculating lane change trajectories.

To do so, the attributes 304 are input into an offset module 314 that determines the offset 122 based on the example flow 400 discussed below. Once the offset 122 is determined, a path module 316 generates the lane change trajectory 110 using the offset 122. The path module 316 may use any number of methods to generate the lane change trajectory 110 such that the offset 122 is achieved (e.g., a jerk optimal polynomial). For example, the offset 122 may provide a point through-which the lane change trajectory 110 should go. The offset 122 along with known start and end points allows the path module 316 to calculate/generate the lane change trajectory 110.

The lane change trajectory 110 is then output, by the trajectory module 108, for receipt by the vehicle component 116. The vehicle component 116 then executes the lane change according to the lane change trajectory 110. For example, the vehicle component 116 may be an autonomous driving system that automatically steers the host vehicle 102 along the lane change trajectory 110.

FIG. 4 is an example flow 400 of determining the offset 122. The example flow 400 may be implemented in any of the previously described environments and by any of the previously described systems or components. For example, the example flow 400 can be implemented in the example environment 100 and/or by the example system 200. The example flow 400 may also be implemented in other environments, by other systems or components, and utilizing other flows or techniques. The example flow 400 may be implemented by one or more entities (e.g., the offset module 314). The order in which the operations are shown and/or described is not intended to be construed as a limitation, and the order may be rearranged without departing from the scope of this disclosure. Furthermore, any number of the operations can be combined with any other number of the operations to implement the example flow or an alternate flow.

At decision 402, the offset module 314 determines whether an asymmetric lane change trajectory is safe. For example, the offset module 314 may determine, based on the conditions 308, that an asymmetric lane change trajectory is unsafe. The conditions 308 may indicate that there is snow or ice on the road, that the road is wet, that the surface is uneven, or any other condition that may cause an unsafe lane change if aggressive steering inputs are used (e.g., an asymmetric lane change). Responsive to determining that an asymmetric lane change trajectory is unsafe (e.g., a "no" out of decision 402), the offset module 314 sets the offset 122 to zero (or whatever value indicates a symmetrical lane change trajectory). Alternatively, the offset module 314 may indicate that the lane change trajectory 110 should be symmetrical.

Responsive to determining that an asymmetric lane change trajectory is safe (e.g., a "yes" out of decision 402), the example flow 400 proceeds to decision 404. At decision 404, the offset module 314 determines whether the preferred offset 310 exists (e.g., for the host vehicle 102 and/or a driver of the host vehicle 102). If the preferred offset 310 does not exist, is zero, or otherwise indicates a preference for symmetrical lane change trajectories (e.g., a "no" out of decision 404), the offset module 314 sets the offset 122 to zero (or whatever value indicates a symmetrical lane change trajectory). Alternatively, the offset module 314 may indicate that the lane change trajectory 110 should be symmetrical.

Responsive to determining that the preferred offset 310 does exist, that the preferred offset 310 is non-zero, or that the preferred offset 310 otherwise indicates a preference for an asymmetrical lane change trajectory (e.g., a "yes" out of decision 404), the example flow 400 proceeds to decision 406. At decision 406, the offset module 314 determines whether the curve inversion 312 exists (e.g., for the host vehicle 102 and/or a driver of the host vehicle 102). If the curve inversion 312 does not exist or otherwise indicates a preference for not inverting preferred offsets for inside curves (e.g., a "no" out of decision 406), the offset module 314 sets the offset 122 to the preferred offset 310.

If the curve inversion 312 does exist or otherwise indicates a preference for inverting preferred offsets for inside curves (e.g., a "yes" out of decision 406), the offset module 314 sets the offset 122 to the inverse of the preferred offset 310. The inverse of the preferred offset 310 may correspond to an offset 122 that is at a similar distance from midpoint of a symmetrical lane change trajectory but opposite the midpoint of the symmetrical lane change trajectory. Regardless of how the preferred offset 310 is implemented, the inverse of the preferred offset 310 causes the lane change trajectory 110 to have reversed aggressiveness compared to the that generated by the preferred offset 310. In other words, the aggressiveness' of the entry and exit of the lane change will be reversed.

It should be noted that the order of the decisions 402, 404, and 406 are not intended to be limiting. The example flow 400 may be modified (either by those skilled in the art or by a compiler or other program) and achieve similar results. For example, the decision 402 may be performed after determining a result of the decision 404 and/or the decision 406, such that the decision 402 acts as a gate for any asymmetric lane change trajectories (e.g., a "yes" from the decision 402 may cause any offset 122 that is non-zero to be zero). Similarly, if the preferred offset 310 is zero, than decisions 402 and 406 may not be performed, as the lane change trajectory 110 would be symmetrical independent of the attributes 304.

By dynamically setting the offset 122 as zero, the preferred offset 310, or an inverse of the preferred offset 310 based on the attributes 304, the offset module 314 is able to better select the offset 122 in a wider variety of environments and situations. Consequently, the path module 316 (and thus, the trajectory module 108 as a whole) is able to dynamically generate the lane change trajectory 110 based on the offset 122 (that is based on the attributes 304). Doing so allows the vehicle component 116 to emulate a specific/preferred driving pattern more accurately while also increasing safety.

Example Method

Figure 5:
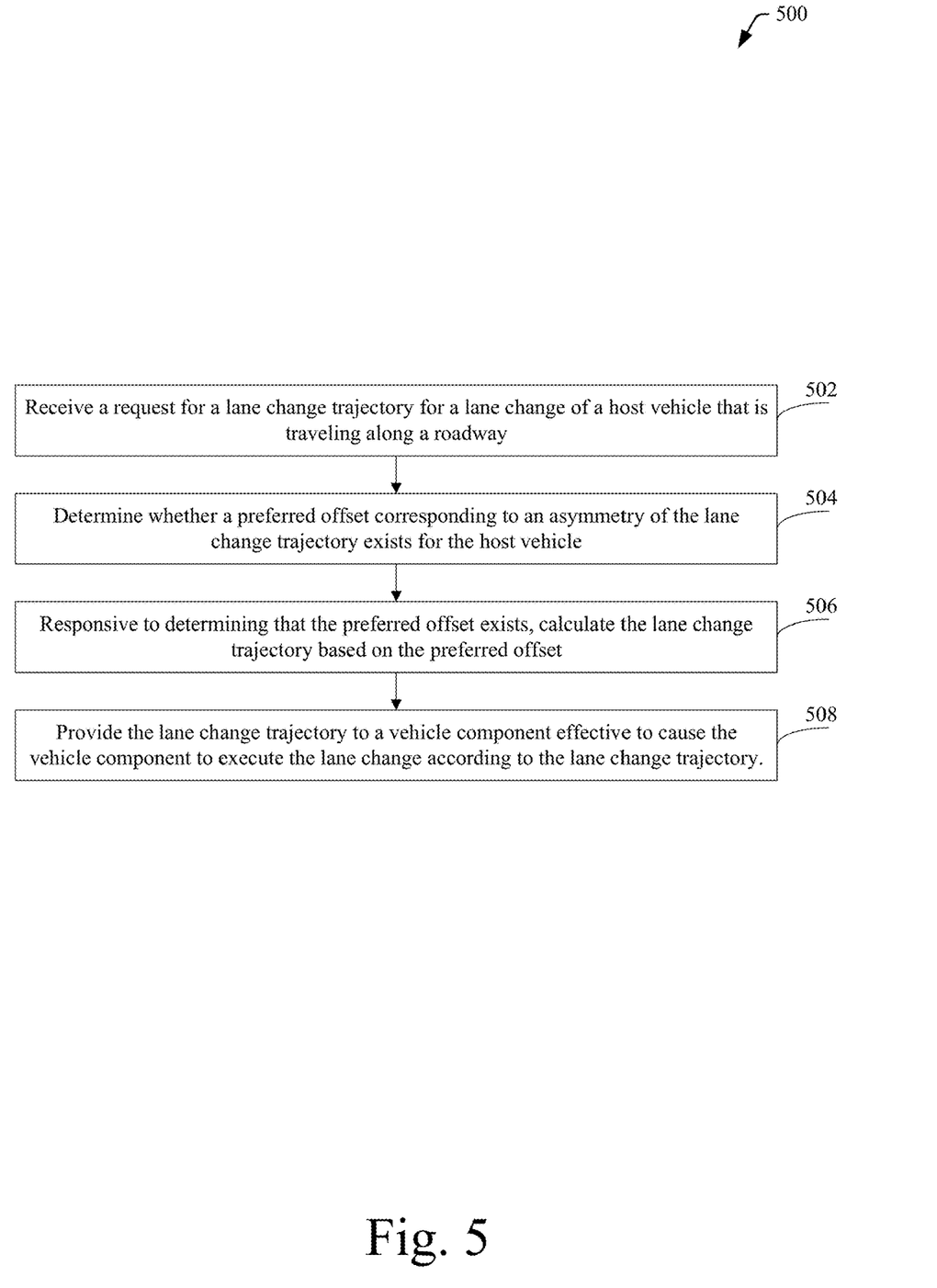
FIG. 5 illustrates, in accordance with techniques of this disclosure, an example method of dynamically calculating lane change trajectories.

FIG. 5 is an example method 500 for dynamically calculating lane change trajectories. The example method 500 may be implemented in any of the previously described environments, by any of the previously described systems or components, and by utilizing any of the previously described flows, process flows, or techniques. For example, the example method 500 can be implemented in the example environment 100, by the example system 200, and/or by following the example flows 300 and/or 400. The example method 500 may also be implemented in other environments, by other systems or components, and utilizing other flows, process flows, or techniques. Example method 500 may be implemented by one or more entities (e.g., the trajectory module 108). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 502, a request for a lane change trajectory for a lane change of a host vehicle that is traveling along a roadway is received. For example, the trajectory module 108 may receive the lane change trajectory request 302.

At 504, it is determined whether a preferred offset corresponding to an asymmetry of the lane change trajectory exists for the host vehicle. For example, the offset module 314 may determine whether the preferred offset 310 exists or is non-zero (e.g., at decision 404).

At 506, responsive to determining that the preferred offset exists, the lane change trajectory is calculated based on the preferred offset. For example, the offset module 314 may determine the offset 122 as the preferred offset 310 or an inverse of the preferred offset 310 (depending on decision 406). In some situations, the offset module 314 may set the offset 122 as zero (e.g., according to decision 402). The offset 122 may then be used by the path module 316 to calculate the lane change trajectory 110.

At 508, the lane change trajectory is provided to a vehicle component effective to cause the vehicle component to execute the lane change according to the lane change trajectory. For example, the path module 316 may output the lane change trajectory 110 such that the vehicle component 116 can execute a lane change according to the lane change trajectory 110.

Examples

Example 1: A method comprising: receiving a request for a lane change trajectory for a lane change of a host vehicle that is traveling along a roadway; determining whether a preferred offset corresponding to an asymmetry of the lane change trajectory exists for the host vehicle; responsive to determining that the preferred offset exists, calculating the lane change trajectory based on the preferred offset; and providing the lane change trajectory to a vehicle component effective to cause the vehicle component to execute the lane change according to the lane change trajectory.

Example 2: The method of example 1, further comprising, responsive to determining that the preferred offset does not exist, calculating the lane change trajectory as a symmetrical lane change trajectory.

Example 3: The method of example 1 or 2, further comprising, receiving a user input indicating the preferred offset.

Example 4: The method of example 3, wherein the preferred offset corresponds to a symmetrical lane change trajectory.

Example 5: The method of any preceding example, further comprising: determining whether road conditions of the roadway are appropriate for an asymmetric lane change trajectory; and responsive to determining that the road conditions are not appropriate for an asymmetric lane change trajectory, calculating the lane change trajectory as a symmetrical lane change trajectory.

Example 6: The method of example 5, wherein the calculating the lane change trajectory based on the preferred offset is further responsive to determining that the road conditions are appropriate for an asymmetric lane change trajectory.

Example 7: The method of any preceding example, further comprising determining whether a preference invert the preferred offset for an inside curve lane change exists for the host vehicle, wherein the calculating the lane change trajectory is further responsive to determining that the preference invert the preferred offset for an inside curve lane change does not exist.

Example 8: The method of example 7, further comprising, responsive to determining that the preference invert the preferred offset for an inside curve lane change does exist, determining a road curvature of the roadway, wherein the calculating the lane change trajectory is based further on the road curvature.

Example 9: The method of example 8, wherein: the road curvature comprises a direction of the road curvature relative to a heading of the host vehicle; and the calculating the lane change trajectory is based further on the direction of the road curvature.

Example 10: The method of example 9, further comprising: determining whether the lane change is into the direction of the road curvature; and responsive to determining that the lane change is into the direction of the road curvature, calculating the lane change trajectory based on an inversion of the preferred offset.

Example 11: The method of example 10, wherein the determining that the lane change is into the direction of the road curvature comprises determining that the lane change is from an outer lane to an inner lane relative to the road curvature.

Example 12: The method of any preceding example, wherein the preferred offset corresponds to a distance from a midpoint between a start point and an end point of the lane change trajectory.

Example 13: The method of any preceding example, wherein: the preferred offset is negative and corresponds to an aggressive entry and a relaxed exit of the lane change; or the preferred offset is positive and corresponds to a relaxed entry and an aggressive exit of the lane change.

Example 14: A system comprising at least one processor configured to: receive a request for a lane change trajectory for a lane change of a host vehicle that is traveling along a roadway; determine whether a preferred offset corresponding to an asymmetry of the lane change trajectory exists for the host vehicle; responsive to determining that the preferred offset exists, calculate the lane change trajectory based on the preferred offset; responsive to determining that the preferred offset does not exist, calculate the lane change trajectory as a symmetrical lane change trajectory; and provide the lane change trajectory to a vehicle component effective to cause the vehicle component to execute the lane change according to the lane change trajectory.

Example 15: The system of example 14, wherein the processor is further configured to receive a user input indicating the preferred offset.

Example 16: The system of example 15, wherein the preferred offset corresponds to a symmetrical lane change trajectory.

Example 17: The system of any of examples 14 to 16, wherein the processor is further configured to: determine whether road conditions of the roadway are appropriate for an asymmetric lane change trajectory; responsive to determining that the road conditions are not appropriate for the asymmetric lane change trajectory, calculate the lane change trajectory as the symmetrical lane change trajectory; responsive to determining that the road conditions are appropriate for the asymmetric lane change trajectory and that that the preferred offset exists, calculate the lane change trajectory based on the preferred offset; and responsive to determining that the road conditions are appropriate for the asymmetric lane change trajectory and that the preferred offset does not exist, calculate the lane change trajectory as the symmetrical lane change trajectory.

Example 18: The system of any of examples 14 to 17, wherein the processor is further configured to: determine whether a preference invert the preferred offset for an inside curve lane change exists for the host vehicle; responsive to determining that the preference invert the preferred offset for an inside curve lane change does not exist and that the preferred offset exists, calculate the lane change trajectory based on the preferred offset; responsive to determining that the preference invert the preferred offset for an inside curve lane change does not exist and that the preferred offset does not exist, calculate the lane change trajectory as the symmetrical lane change trajectory; and responsive to determining that the preference invert the preferred offset for an inside curve lane change does exist: determine whether the lane change is into a curvature of the roadway; responsive to determining that the lane change is not into the curvature of the roadway and that the preferred offset exists, calculate the lane change trajectory based on the preferred offset; responsive to determining that the lane change is not into the curvature of the roadway and that the preferred offset does not exist, calculate the lane change trajectory as the symmetrical lane change trajectory; responsive to determining that the lane change is into the curvature of the roadway and that the preferred offset exists, calculate the lane change trajectory based on an inversion of the preferred offset; and responsive to determining that the lane change is into the curvature of the roadway and that the preferred offset does not exist, calculate the lane change trajectory as the symmetrical lane change trajectory.

Example 19: The system of example 18, wherein: the determination that the lane change is into the curvature of the roadway comprises determining that the lane change is from an outer lane to an inner lane relative to the curvature; and the determination that the lane change is not into the curvature of the roadway comprises determining that the lane change is from an inner lane to an outer lane relative to the curvature.

Example 20: Computer-readable storage media comprising instructions that, when executed, cause at least one processor to: receive a request for a lane change trajectory for a lane change of a host vehicle that is traveling along a roadway; determine whether a preferred offset corresponding to an asymmetry of the lane change trajectory exists for the host vehicle; responsive to determining that the preferred offset exists, calculate the lane change trajectory based on the preferred offset; responsive to determining that the preferred offset does not exist, calculate the lane change trajectory as a symmetrical lane change trajectory; and provide the lane change trajectory to a vehicle component effective to cause the vehicle component to execute the lane change according to the lane change trajectory.

Example 21: A system comprising: at least one processor configured to perform the method of any of examples 1-13.

Example 22: Computer-readable storage media comprising instructions that, when executed, cause at least one processor to perform the method of any of examples 1-13.

Example 23: A system comprising means for performing the method of any of examples 1-13.

Example 24: A method performed by the system of any of examples 14-19.

Example 25: A method comprised by the instructions of example 20.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   receiving a request for a lane change trajectory for a lane change of a host vehicle that is traveling along a roadway;
   determining whether a preferred offset exists for the host vehicle, the preferred offset being an amount of asymmetry of the lane change trajectory, and whereby the preferred offset is indicative of a preference for a shape of the lane change trajectory, namely whether the lane change trajectory i) has an aggressive entry and relaxed exit, ii) is a symmetrical lane change, or iii) has a relaxed entry and aggressive exit, wherein a range of values of the preferred offset includes a) a first range indicative of an aggressive entry and relaxed exit, b) a second range indicative of a symmetrical lane change, and c) a third range indicative of a relaxed entry and aggressive exit;
   responsive to determining that the preferred offset exists, calculating the lane change trajectory based on the preferred offset; and
   providing the lane change trajectory to a vehicle component effective to cause the vehicle component to execute the lane change according to the lane change trajectory.

2. The method of claim 1, further comprising, responsive to determining that the preferred offset does not exist, calculating the lane change trajectory as a symmetrical lane change trajectory.

3. The method of claim 1, further comprising, receiving a user input indicating the preferred offset.

4. The method of claim 3, wherein the preferred offset corresponds to a symmetrical lane change trajectory.

5. The method of claim 1, further comprising:
   determining whether road conditions of the roadway are appropriate for an asymmetric lane change trajectory; and
   responsive to determining that the road conditions are not appropriate for an asymmetric lane change trajectory, calculating the lane change trajectory as a symmetrical lane change trajectory.

6. The method of claim 5, wherein the calculating the lane change trajectory based on the preferred offset is further responsive to determining that the road conditions are appropriate for an asymmetric lane change trajectory.

7. The method of claim 1, further comprising determining whether a preference to invert the preferred offset for an inside curve lane change exists for the host vehicle, wherein the calculating the lane change trajectory is further responsive to determining that the preference to invert the preferred offset for an inside curve lane change does not exist.

8. The method of claim 7, further comprising, responsive to determining that the preference to invert the preferred offset for an inside curve lane change does exist, determining a road curvature of the roadway, wherein the calculating the lane change trajectory is based further on the road curvature.

9. The method of claim 8, wherein:
the road curvature comprises a direction of the road curvature relative to a heading of the host vehicle; and
calculating the lane change trajectory is based further on the direction of the road curvature.

10. The method of claim 9, further comprising:
determining whether the lane change is into the direction of the road curvature; and
responsive to determining that the lane change is into the direction of the road curvature, calculating the lane change trajectory based on an inversion of the preferred offset.

11. The method of claim 10, wherein the determining that the lane change is into the direction of the road curvature comprises determining that the lane change is from an outer lane to an inner lane relative to the road curvature.

12. The method of claim 1, wherein the preferred offset corresponds to a distance from a midpoint between a start point and an end point of the lane change trajectory.

13. The method of claim 1, wherein:
the preferred offset is negative and corresponds to an aggressive entry and a relaxed exit of the lane change; or
the preferred offset is positive and corresponds to a relaxed entry and an aggressive exit of the lane change.

14. The method of claim 1, further comprising calculating the preferred offset for the lane change trajectory based on driver preferences and road conditions, wherein the preferred offset is indicative of an amount of asymmetry between an entry and an exit of the lane change.

15. The method of claim 1, wherein:
an entry of the lane change trajectory refers to a first portion of the lane change trajectory prior to an inflection point of the lane change trajectory; and
an exit of the lane change trajectory refers to a second portion of the lane trajectory subsequent to the inflection point of the lane change trajectory.

16. A system comprising at least one processor configured to:
receive a request for a lane change trajectory for a lane change of a host vehicle that is traveling along a roadway;
determine whether a preferred offset exists for the host vehicle, the preferred offset being an amount of asymmetry of the lane change trajectory, and whereby the preferred offset is indicative of a preference for a shape of the lane change trajectory, namely whether the lane change trajectory i) has an aggressive entry and relaxed exit, ii) is a symmetrical lane change, or iii) has a relaxed entry and aggressive exit, wherein a range of values of the preferred offset includes a) a first range indicative of an aggressive entry and relaxed exit, b) a second range indicative of a symmetrical lane change, and c) a third range indicative of a relaxed entry and aggressive exit;
responsive to determining that the preferred offset exists, calculate the lane change trajectory based on the preferred offset;
responsive to determining that the preferred offset does not exist, calculate the lane change trajectory as a symmetrical lane change trajectory; and
provide the lane change trajectory to a vehicle component effective to cause the vehicle component to execute the lane change according to the lane change trajectory.

17. The system of claim 16, wherein the processor is further configured to receive a user input indicating the preferred offset.

18. The system of claim 17, wherein the preferred offset corresponds to a symmetrical lane change trajectory.

19. The system of claim 16, wherein the processor is further configured to:
determine whether road conditions of the roadway are appropriate for an asymmetric lane change trajectory;
responsive to determining that the road conditions are not appropriate for the asymmetric lane change trajectory, calculate the lane change trajectory as the symmetrical lane change trajectory;
responsive to determining that the road conditions are appropriate for the asymmetric lane change trajectory and that that the preferred offset exists, calculate the lane change trajectory based on the preferred offset; and
responsive to determining that the road conditions are appropriate for the asymmetric lane change trajectory and that the preferred offset does not exist, calculate the lane change trajectory as the symmetrical lane change trajectory.

20. The system of claim 16, wherein the processor is further configured to:
determine whether a preference to invert the preferred offset for an inside curve lane change exists for the host vehicle;
responsive to determining that the preference to invert the preferred offset for an inside curve lane change does not exist and that the preferred offset exists, calculate the lane change trajectory based on the preferred offset;
responsive to determining that the preference to invert the preferred offset for an inside curve lane change does not exist and that the preferred offset does not exist, calculate the lane change trajectory as the symmetrical lane change trajectory; and
responsive to determining that the preference to invert the preferred offset for an inside curve lane change does exist:
determine whether the lane change is into a curvature of the roadway;
responsive to determining that the lane change is not into the curvature of the roadway and that the preferred offset exists, calculate the lane change trajectory based on the preferred offset;
responsive to determining that the lane change is not into the curvature of the roadway and that the preferred offset does not exist, calculate the lane change trajectory as the symmetrical lane change trajectory;
responsive to determining that the lane change is into the curvature of the roadway and that the preferred offset exists, calculate the lane change trajectory based on an inversion of the preferred offset; and
responsive to determining that the lane change is into the curvature of the roadway and that the preferred offset does not exist, calculate the lane change trajectory as the symmetrical lane change trajectory.

21. The system of claim 20, wherein:
the determination that the lane change is into the curvature of the roadway comprises determining that the lane change is from an outer lane to an inner lane relative to the curvature; and
the determination that the lane change is not into the curvature of the roadway comprises determining that the lane change is from an inner lane to an outer lane relative to the curvature.

22. Non-transitory computer-readable storage media comprising instructions that, when executed by at least one processor, cause the at least one processor to:
receive a request for a lane change trajectory for a lane change of a host vehicle that is traveling along a roadway;
determine whether a preferred offset exists for the host vehicle, the preferred offset being an amount of asymmetry of the lane change trajectory, and whereby the preferred offset is indicative of a preference for a shape of the lane change trajectory, namely whether the lane change trajectory i) has an aggressive entry and relaxed exit, ii) is a symmetrical lane change, or iii) has a relaxed entry and aggressive exit, wherein a range of values of the preferred offset includes a) a first range indicative of an aggressive entry and relaxed exit, b) a second range indicative of a symmetrical lane change, and c) a third range indicative of a relaxed entry and aggressive exit;
responsive to determining that the preferred offset exists, calculate the lane change trajectory based on the preferred offset;
responsive to determining that the preferred offset does not exist, calculate the lane change trajectory as a symmetrical lane change trajectory; and
provide the lane change trajectory to a vehicle component effective to cause the vehicle component to execute the lane change according to the lane change trajectory.

* * * * *